United States Patent
Norsten et al.

(10) Patent No.: US 7,541,119 B2
(45) Date of Patent: Jun. 2, 2009

(54) INKLESS REIMAGEABLE PRINTING PAPER AND METHOD

(75) Inventors: Tyler B. Norsten, Oakville (CA); Gabriel Iftime, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/762,150

(22) Filed: Jun. 13, 2007

(65) Prior Publication Data

US 2008/0311490 A1    Dec. 18, 2008

(51) Int. Cl.
*G03F 7/00*    (2006.01)
*G03F 7/004*    (2006.01)

(52) U.S. Cl. .................. 430/19; 430/270.1; 430/905

(58) Field of Classification Search ............ 430/19, 430/270.1, 905
See application file for complete search history.

(56) References Cited

U.S. PATENT DOCUMENTS

| | | | |
|---|---|---|---|
| 3,825,427 A | 7/1974 | Inoue et al. | |
| 3,877,941 A | 4/1975 | Lohmann | |
| 3,961,948 A | 6/1976 | Saeva | |
| 4,425,161 A | 1/1984 | Shibahashi et al. | |
| 4,598,035 A | 7/1986 | Usami et al. | |
| 4,659,649 A | 4/1987 | Dickinson et al. | |
| 4,931,337 A | 6/1990 | Miyazaki et al. | |
| 5,124,236 A | 6/1992 | Yamaguchi et al. | |
| 5,262,280 A | 11/1993 | Knudsen et al. | |
| 5,376,511 A | 12/1994 | Tatezono et al. | |
| 5,458,874 A | 10/1995 | Pereira et al. | |
| 5,677,107 A | 10/1997 | Neckers | |
| 5,691,100 A | 11/1997 | Kudo et al. | |
| 5,691,395 A | 11/1997 | Knudsen et al. | |
| 5,747,225 A | 5/1998 | Manico et al. | |
| 6,067,185 A | 5/2000 | Albert et al. | |
| 6,103,378 A | 8/2000 | Yao et al. | |
| 6,200,646 B1 | 3/2001 | Neckers et al. | |
| 6,528,221 B2 | 3/2003 | Takezawa et al. | |
| 6,579,662 B1 * | 6/2003 | Zheng et al. | 430/281.1 |
| 6,680,281 B2 | 1/2004 | Tajiri et al. | |
| 6,761,758 B2 | 7/2004 | Boils-Boissier et al. | |
| 6,866,981 B2 * | 3/2005 | Furukawa et al. | 430/270.1 |
| 6,867,408 B1 | 3/2005 | Gu et al. | |

(Continued)

FOREIGN PATENT DOCUMENTS

CA    2 053 094 A1    4/1992

(Continued)

OTHER PUBLICATIONS

Vladimir I. Minkin, "Photo-, Thermo-, Solvato-, and Electrochromic Spiroheterocyclic Compounds," Chemical Reviews, 104, 5, pp. 2751-2776 (2004).

(Continued)

*Primary Examiner*—Amanda C. Walke
(74) *Attorney, Agent, or Firm*—Oliff & Berridge Plc

(57) ABSTRACT

An image forming medium includes a substrate and an imaging layer coated on or impregnated into said substrate, where the imaging layer includes a photochromic material dispersed in an ionomer, optionally with an additional polymeric binder, and where the photochromic material exhibits a reversible transition between a colorless state and a colored state in response to heat and optional light.

22 Claims, 2 Drawing Sheets

U.S. PATENT DOCUMENTS

| | | | |
|---|---|---|---|
| 6,906,118 | B2 | 6/2005 | Goodbrand et al. |
| 7,018,714 | B2 | 3/2006 | Kobayashi et al. |
| 7,057,054 | B2 | 6/2006 | Irie et al. |
| 7,205,088 | B2 | 4/2007 | Iftime et al. |
| 7,214,456 | B2 | 5/2007 | Iftime et al. |
| 7,229,740 | B2 | 6/2007 | Iftime et al. |
| 7,256,921 | B2 | 8/2007 | Kumar et al. |
| 7,332,257 | B2 | 2/2008 | Miyako et al. |
| 7,381,506 | B2 | 6/2008 | Iftime et al. |
| 7,441,887 | B2 | 10/2008 | Senga et al. |
| 2002/0160318 | A1 | 10/2002 | Richter et al. |
| 2003/0130456 | A1 | 7/2003 | Kim et al. |
| 2005/0012998 | A1* | 1/2005 | Kumar et al. ............... 359/494 |
| 2005/0244744 | A1 | 11/2005 | Kazmaier et al. |
| 2005/0269556 | A1 | 12/2005 | Evans et al. |
| 2006/0001944 | A1 | 1/2006 | Chopra et al. |
| 2006/0222972 | A1 | 10/2006 | Chopra et al. |
| 2006/0222973 | A1 | 10/2006 | Iftime et al. |
| 2006/0236470 | A1 | 10/2006 | Sabnis et al. |
| 2006/0251988 | A1 | 11/2006 | Iftime et al. |
| 2006/0257785 | A1 | 11/2006 | Johnson |
| 2007/0054215 | A1 | 3/2007 | Iftime et al. |
| 2007/0072110 | A1 | 3/2007 | Iftime et al. |
| 2007/0112103 | A1 | 5/2007 | Zhou et al. |

FOREIGN PATENT DOCUMENTS

| | | |
|---|---|---|
| EP | 1 367 111 | 12/2003 |
| EP | 1 405 891 | 4/2004 |
| EP | 1 591 829 | 11/2005 |
| EP | 1 591 831 | 11/2005 |
| FR | 2774998 | 8/1999 |
| GB | 2 430 257 | 3/2007 |
| JP | 57-136645 | 8/1982 |
| JP | A-61-175087 | 8/1986 |
| JP | A-5-265129 | 10/1993 |
| JP | A-11-30835 | 2/1999 |
| JP | A-2002-240441 | 8/2002 |
| JP | A-2002-285146 | 10/2002 |
| JP | A-2003-255489 | 9/2003 |
| JP | A-2003-255490 | 9/2003 |
| JP | A-2004-039009 | 2/2004 |
| JP | A-2004-045037 | 2/2004 |
| JP | A-2004-091638 | 3/2004 |
| JP | A-2004-149501 | 5/2004 |
| JP | A-2004-256780 | 9/2004 |
| JP | A-2005-082507 | 3/2005 |
| JP | A-2005-250463 | 9/2005 |
| WO | WO 97/31033 | 8/1997 |
| WO | WO 00/16985 A1 | 3/2000 |
| WO | WO 2006/039130 A1 | 4/2006 |
| WO | WO 2008/043853 A2 | 4/2008 |

OTHER PUBLICATIONS

U.S. Appl. No. 11/762,152, filed Jun. 13, 2007, to Iftime et al.
U.S. Appl. No. 11/762,327, filed Jun. 13, 2007, to Iftime et al.
U.S. Appl. No. 11/762,147, filed Jun. 13, 2007, to Iftime et al.
U.S. Appl. No. 11/762,098, filed Jun. 13, 2007, to Iftime et al.
U.S. Appl. No. 11/762,157, filed Jun. 13, 2007, to Iftime et al.
U.S. Appl. No. 11/762,153, filed Jun. 13, 2007, to Iftime et al.
U.S. Appl. No. 11/762,144, filed Jun. 13, 2007, to Kazmaier et al.
U.S. Appl. No. 11/762,150, filed Jun. 13, 2007, to Norsten et al.
U.S. Appl. No. 11/762,107, filed Jun. 13, 2007, to Iftime et al.
U.S. Appl. No. 11/762,176, filed Jun. 13, 2007, to Norsten et al.
U.S. Appl. No. 11/762,307, filed Jun. 13, 2007, to Norsten et al.
U.S. Appl. No. 11/762,159, filed Jun. 13, 2007, to Kazmaier et al.
U.S. Appl. No. 11/762,311, filed Jun. 13, 2007, to Kazmaier et al.
Wojtyk et al., "Effects of metal ion complexation on the spiropyran-merocyanine interconversion: development of a thermally stable photo-switch," J. Chem. Soc. Chem, Comm., pp. 1703-1704, 1998.
M. Irie, "Diarylethense for Memories and Switches," Chem Reviews, 100, pp. 1685-1716 (2000).
Kentaro Morimitsu et al., "Dithienylethenes With a Novel Photochromic Performance," J. Org. Chem., vol. 67, pp. 4574-4578 (2002).
"Dolch Introduces World's First Ruggedized Notebook with Integrated Printer" available at http://news.thomasnet.com/fullstory/7005/447, pp. 1-4, Feb. 6, 2002.
Masamitsu Shirai et al., "Photoacid and Photobase Generators: Chemistry and Applications to Polymeric Materials," *Prog. Polym. Sci.* vol. 21, pp. 1-45 (1996).
T. Hirose et al., "Self-Assembly of Photochromic Diarylethenes With Amphiphilic Side Chains: Reversible Thermal and Photochemical Control," J. Org. Chem., 71, pp. 7499-7508 (2006).
T. Norsten et al., "Photoregulation of Fluorescence in a Porphyrinic Dithienylethene Photochrome," J. Am. Chem. Soc., 123(8), pp. 1784-1785 (2001).
Takayuki Suzuki et al., "Stabilization of the merocyanine form of photochromic compounds in fluoro alcohols is due to a hydrogen bond", Chem. Commun., 2685-2686 (1998).
Ronald F.M. Lange et al., "Supramolecular polymer interactions based on the alternating copolymer of styrene and Maleimide" Macromolecules, 28, 782-783 (1995).
Vladimir I. Minkin et al., "Perimidine spirocyclohexa dienones" in Organic Photochromic and Thermochromic Compounds, V1, Plenum Press, pp. 315-340 (1999).
John Biteau et al., "Photochromism of Spirooxazine-Doped Gels," J. Phys. Chem., 100, 9024-9031 (1996).
Leonard J. Prins et al., "Noncovalent Synthesis Using Hydrogen Bonding," Angew. Chem. Int. Ed., 40, 2382-2426 (2001).
Terry M. Cresp et al., "A Synthesis of αβ-Unsaturated Aldehydes," J. Chem. Soc., Perkin Trans., 1, pp. 37-41 (1974).
Elliot Berman et al., "Photochromic Spiropyrans. I. The Effect of Substituents on the Rate of Ring Closure," J. Am. Chem. Soc., 81, 5605-5608 (1959).
Sheng-Hua Liu et al., "Synthesis of Negative Photochromic Crowned Spirobenzopyrans," Syn. Commun., 30, 5, 895-902 (2000).
Yu M. Chunaev et al., "Reaction of the Fischer Base With Nitro- and Bromo-Substituted αHydroxycinnamaldehydes," Chem. Heterocycl. Compd., 628-631 (1984).
Kentaro Morimitsu et al., "Thermal Cycloreversion Reaction of a Photochromic Dithienylperfluorocyclopentene with *tert*-Butoxy Substituents at the Reactive Carbons," The Chemical Society of Japan, 2002, p. 572-573.

* cited by examiner

INKLESS REIMAGEABLE PRINTING PAPER AND METHOD

TECHNICAL FIELD

This disclosure is generally directed to a substrate, method, and apparatus for inkless printing on reimageable paper. More particularly, in embodiments, this disclosure is directed to an inkless reimageable printing substrates, such as inkless printing paper utilizing a composition that is imageable and eraseable by heat and light, such as comprising a photochromic material dispersed in an ionomer, optionally with an additional polymeric binder, wherein the photochromic material exhibits a reversible transition between a colorless state and a colored state in response to light. Imaging is conducted by applying UV light to the imaging material to cause a color change, and erasing is conducted by applying heat to the imaging material to reverse the color change. Other embodiments are directed to inkless printing methods using the inkless printing substrates, and apparatus and systems for such printing.

CROSS-REFERENCE TO RELATED APPLICATIONS

Disclosed in commonly assigned U.S. patent application Ser. No. 11/123,163, filed May 6, 2005, is an image forming medium, comprising a polymer, a photochromic compound containing chelating groups embedded in the polymer, and a metal salt, wherein molecules of the photochromic compound are chelated by a metal ion from the metal salt.

Disclosed in commonly assigned U.S. patent application Ser. No. 10/835,518, filed Apr. 29, 2004, is an image forming method comprising: (a) providing a reimageable medium comprised of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure.

Disclosed in commonly assigned U.S. patent application Ser. No. 10/834,722, filed Apr. 29, 2004, is a reimageable medium comprising: a substrate; and a photochromic material, wherein the medium is capable of exhibiting a color contrast and an absence of the color contrast, wherein the medium has a characteristic that when the medium exhibits the absence of the color contrast and is then exposed to an imaging light corresponding to a predetermined image to result in an exposed region and a non-exposed region, the color contrast is present between the exposed region and the non-exposed region to form a temporary image corresponding to the predetermined image that is visible for a visible time, wherein the medium has a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature, and wherein the medium is capable of undergoing multiple cycles of temporary image formation and temporary image erasure.

Disclosed in commonly assigned U.S. patent application Ser. No. 11/220,803, filed Sep. 8, 2005, is an image forming medium, comprising: a substrate; and an imaging layer comprising a photochromic material and a polymer binder coated on said substrate, wherein the photochromic material exhibits a reversible homogeneous-heterogeneous transition between a colorless state and a colored state in the polymer binder.

Disclosed in commonly assigned U.S. patent application Ser. No. 11/220,572, filed Sep. 8, 2005, is an image forming medium, comprising: a substrate; and a mixture comprising a photochromic material and a solvent wherein said mixture is coated on said substrate, wherein the photochromic material exhibits a reversible homogeneous-heterogeneous transition between a colorless state and a colored state in the solvent.

Disclosed in commonly assigned U.S. patent application Ser. No. 11/123,163, filed May 6, 2005, is an image forming medium, comprising a polymer; and a photochromic compound containing chelating groups embedded in the polymer; and a metal salt; wherein molecules of the photochromic compound are chelated by a metal ion from the metal salt.

Disclosed in commonly assigned U.S. patent application Ser. No. 11/093,993, filed Mar. 20, 2005, is a reimageable medium, comprising: a substrate having a first color; a photochromic layer adjacent to the substrate; a liquid crystal layer adjacent to the photochromic layer, wherein the liquid crystal layer includes a liquid crystal composition; and an electric field generating apparatus connected across the liquid crystal layer, wherein the electric field generating apparatus supplies a voltage across the liquid crystal layer.

Disclosed in commonly assigned U.S. patent application Ser. No. 10/834,529, filed Apr. 29, 2004, is a reimageable medium for receiving an imaging light having a predetermined wavelength scope, the medium comprising: a substrate; a photochromic material capable of reversibly converting among a number of different forms, wherein one form has an absorption spectrum that overlaps with the predetermined wavelength scope; and a light absorbing material exhibiting a light absorption band with an absorption peak, wherein the light absorption band overlaps with the absorption spectrum of the one form.

The entire disclosure of the above-mentioned applications are totally incorporated herein by reference.

BACKGROUND

Inkjet printing is a well-established market and process, where images are formed by ejecting droplets of ink in an image-wise manner onto a substrate. Inkjet printers are widely used in home and business environments, and particularly in home environments due to the low cost of the inkjet printers. The inkjet printers generally allow for producing high quality images, ranging from black-and-white text to photographic images, on a ride range of substrates such as standard office paper, transparencies, and photographic paper.

However, despite the low printer costs, the cost of replacement inkjet cartridges can be high, and sometimes higher than the cost of the printer itself. These cartridges must be replaced frequently, and thus replacement costs of the ink cartridges is a primary consumer complaint relating to inkjet printing.

Reducing ink cartridge replacement costs would thus be a significant enhancement to inkjet printing users.

In addition, many paper documents are promptly discarded after being read. Although paper is inexpensive, the quantity of discarded paper documents is enormous and the disposal of these discarded paper documents raises significant cost and environmental issues. Accordingly, there is a continuing desire for providing a new medium for containing the desired image, and methods for preparing and using such a medium. In aspects thereof it would be desirable to be reusable, to abate the cost and environmental issues, and desirably also is flexible and paper-like to provide a medium that is customarily acceptable to end-users and easy to use and store.

Although there are available technologies for transient image formation and storage, they generally provide less than desirable results for most applications as a paper substitute. For example, alternative technologies include liquid crystal displays, electrophoretics, and gyricon image media. However, these alternative technologies may not in a number of instances provide a document that has the appearance and feel of traditional paper, while providing the desired reimageability.

Imaging techniques employing photochromic materials, that is materials which undergo reversible or irreversible photoinduced color changes are known, for example, U.S. Pat. No. 3,961,948 discloses an imaging method based upon visible light induced changes in a photochromic imaging layer containing a dispersion of at least one photochromic material in an organic film forming binder.

These and other photochromic (or reimageable or electric) papers are desirable because they can provide imaging media that can be reused many times, to transiently store images and documents. For example, applications for photochromic based media include reimageable documents such as, for example, electronic paper documents. Reimageable documents allow information to be kept for as long as the user wants, then the information can be erased or the reimageable document can be re-imaged using an imaging system with different information.

Although the above-described approaches have provided reimageable transient documents, there is a desire for reimageable paper designs that provide longer image life-times, and more desirable paper-like appearance and feel. For example, while the known approaches for photochromic paper provide transient visible images, the visible images are very susceptible to UV, such as is present in both ambient interior light and more especially in sun light, as well as visible light. Due to the presence of this UV and visible light, the visible images are susceptible to degradation by the UV light, causing the unimaged areas to darken and thereby decrease the contrast between the desired image and the background or unimaged areas.

That is, a problem associated with transient documents is the sensitivity of the unimaged areas to ambient UV-VIS light (such as <420 nm) where the photochromic molecule absorbs. Unimaged areas become colored after a period of time, decreasing the visual quality of the document, because the contrast between white and colored state is reduced. One approach, described in the above-referenced U.S. patent application Ser. No. 10/834,529, is to stabilize the image against light of wavelength <420 nm by creating a band-pass window for the incident light capable of isomerising (i.e. inducing coloration) in the material, centered around 365 nm. However, the unimaged areas of the documents still are sensitive to UV-VIS light of wavelength centered around 365 nm.

Another problem generally associated with known transient documents is that common photochromic materials such as merocyanines (the colored state isomer form of spiropyrans) are not significantly stable over time to ambient heat and light, and thus tend to revert back to the colorless state through both thermal and visible light. It is known that some photochromic materials, such as the merocyanines, can form molecular aggregation of the charged molecules in solution and thus result in long lived colored states due to the stabilization of the colored-ionic state. However, formation of such stabilized aggregates in the solid state, such as in a dried layer comprising a polymer binder, is much more difficult, and thus it is more difficult to achieve the stable long lived colored states.

SUMMARY

It is desirable for some uses that an image formed on a reimageable medium such as a transient document remains stable for extended time periods, without the image or image contrast being degraded by exposure to ambient UV light. However, it is also desired that the image can be erased when desired, to permit reimaging of the medium. It is also desired that the imaging medium be similar to conventional paper, that is, having the look and feel of conventional paper. This generally requires that the imaging composition of the imaging medium be a solid layer, not a layer of a solvent-based system. Electronic paper documents should also maintain a written image for as long as the user needs to view it, without the image being degraded by ambient heat or light. The image may then be erased or replaced with a different image by the user on command.

The present disclosure addresses these and other needs, in embodiments, by providing a reimageable image forming medium utilizing a composition that is both imageable and eraseable by heat and light, and which comprises an imaging composition that comprises a photochromic material dispersed in an ionomer, optionally with an additional polymeric binder. Imaging is conducted by applying UV light to the imaging material to cause a color change, and erasing is conducted by applying heat and optionally light to the imaging material to reverse the color change. The present disclosure in other embodiments provides an inkless printing method using the reimageable inkless printing substrates, and apparatus and systems for such printing.

The present disclosure thereby provides a printing media, method, and printer system for printing images without using ink or toner. The paper media has a paper-like look and feel and carries a special imageable composition and it is printed and can be erased with light and/or heat. The paper media thus allows image formation and erasure using a printer that does not require ink or toner replacement, and instead images the paper using a UV light source, such as a LED.

In an embodiment, the present disclosure provides a reimageable image forming medium, comprising
a substrate; and
an imaging layer coated on or impregnated into said substrate, wherein the imaging layer comprises a photochromic material dispersed in an ionomer, optionally with an additional polymeric binder;
wherein the photochromic material exhibits a reversible transition between a colorless state and a colored state in response to heat and optional light.

In another embodiment, the present disclosure provides a method of making a reimageable image forming medium, comprising applying an imaging layer composition to a substrate, wherein the imaging layer comprises a photochromic material dispersed in an ionomer, optionally with an additional polymeric binder;

wherein the photochromic material exhibits a reversible transition between a colorless state and a colored state in response to heat and optional light.

In another aspect, the present disclosure provides a method of forming an image, comprising:
providing an image forming medium comprising:
a substrate; and
an imaging layer coated on or impregnated into said substrate, wherein the imaging layer comprises a photochromic material dispersed in an ionomer, optionally with an additional polymeric binder; and
exposing the image forming medium to UV irradiation of a first wavelength in an imagewise manner,
wherein the photochromic material exhibits a reversible transition between a colorless state and a colored state in response to heat and optional light.

The imaging method can be conducted, for example, using an imaging system, comprising:
the above image forming medium; and
a printer comprising two irradiation sources, wherein one irradiation source sensitizes the photochromic material to convert the photochromic material from a colorless state to a colored state the other irradiation source converts the photochromic material from a colored state to a colorless state.

DETAILED DESCRIPTION OF EXEMPLARY EMBODIMENTS

Generally, in various exemplary embodiments, there is provided an inkless reimageable paper or image forming medium formed using a composition that is imageable by light such as ultraviolet light and eraseable by heat and/or light, such as comprising a photochromic material dispersed in an ionomer, optionally with an additional polymeric binder. Exposing the imaging layer to UV light causes the photochromic material to easily convert from the colorless state to a colored state. The ionic nature of the ionomer helps stabilize the ionic form of the photochromic material, and thus locks in the colored state when the light is removed. Likewise, exposing the imaging layer to visible light and/or heat causes the photochromic material to convert back from the colored state to the colorless state. The ionomer provides a more polar or ionic medium, which stabizes the colored-ionic state of the photochromic material, which makes the colored state more stable against heat and light in the ambient environment and provides a more prolonged visible image, but which can be erased on demand using a suitable erasing step. The composition thus exhibits a reversible transition between a clear state, particularly a non-ionic clear state, and a colored state, particularly an ionic colored state, in the image forming medium. By a colored state, in embodiments, refers to for example, the presence of visible wavelengths; likewise, by a colorless state, in embodiments, refers to for example, the complete or substantial absence of visible wavelengths.

Figure 1:
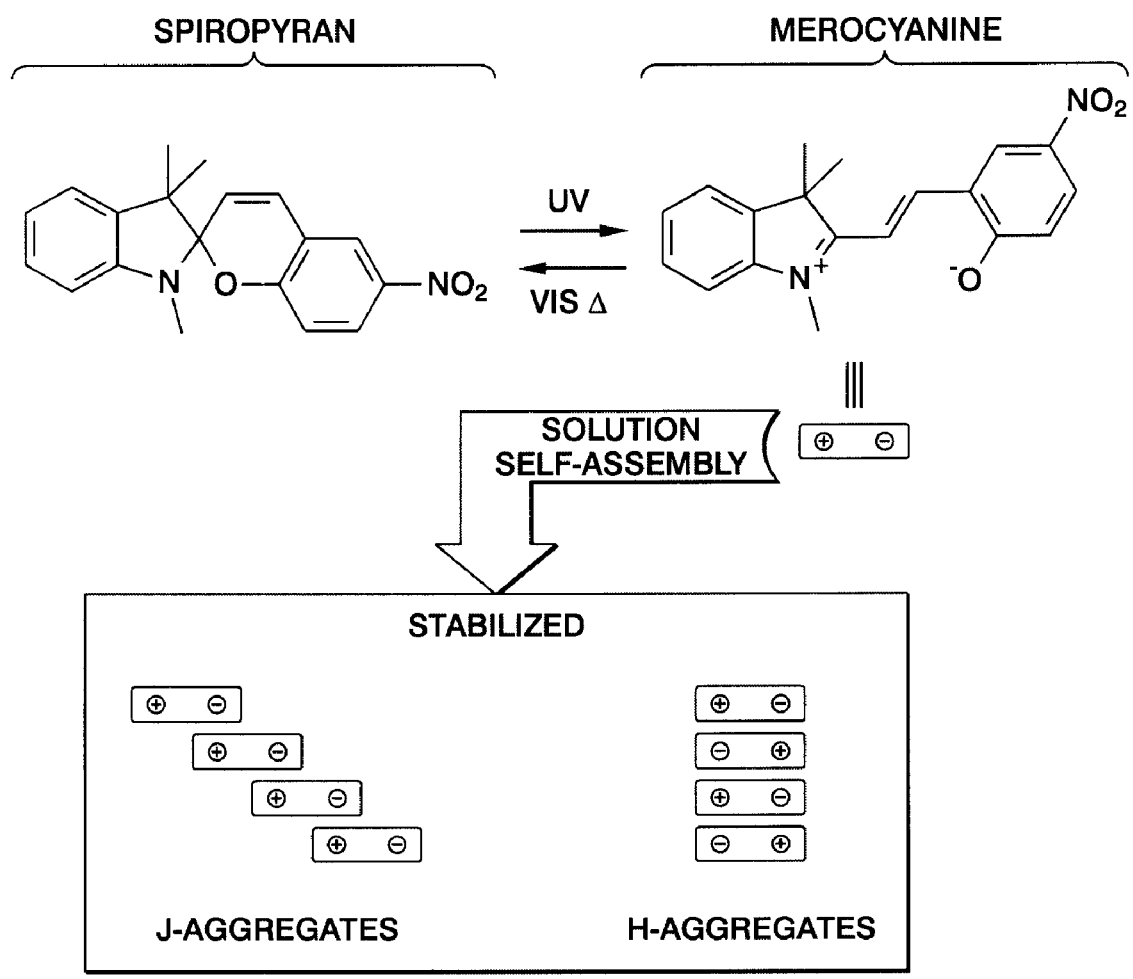
FIG. 1 is a schematic representations of interaction of photochromic material molecules in a solution.

The present disclosure is thus distinguished from a solvent-based system, where the photochromic material, such as a spiropyran/merocyanine material, is simply dissolved or dispersed in a suitable solvent. For example, merocyanines (the isomer responsible for creating image contrast in spiropyran/merocyanine material systems) are not significantly stable to ambient conditions, and tend to quickly and easily revert back to the colorless state through both thermal and visible light activation. However, it is known that in solution, such as with polar solvents and/or other conditions favoring molecular aggregation, the merocyanines can aggregate into J and H aggregate forms. The J form is a ladder-type structure, where each merocyanine molecule is oriented in the same direction, such that the moelcules form an offset stack where negative and positive poles of the molecules overlap, while the H form is more a stack-type structure, where alternating merocyanine molecule are oriented in opposite directions, such that the moelcules form a straight stack where the entire molecules overlap such that both negative and positive poles of the adjacent molecules overlap. These stacking structures can result in longer lived colored states due to the stabilization of the colored-ionic states. See, for example, Chemical Reviews, 2004, 104, 5, 2751. These aggregate forms produced by a spiropyran/merocyanine material in solution, are shown illustratively in FIG. 1. The aggregation/stabilization is a result of intermolecular interactions between the oppositley charged portions of the molecules. In solution, the species have adequate mobilty to both combine and self-assemble into aggregates. However, this same level of mobility may not be present in solid state materials, where the photochromic material is dispersed in a polymer binder, and thus the more stable aggregates do not as readily form.

In embodiments, to overcome this problem, the image forming medium generally comprises an imaging layer coated on or impregnated in a suitable substrate material, or sandwiched or laminated between a first and a second substrate material (i.e., a substrate material and an overcoat layer). The imaging layer can include any suitable photochromic material dispersed in an ionomer, optionally with an additional polymeric binder. The ionomer can function as a sole polymer binder for forming the imaging layer, or an optional additional polymer binder can be used, such as a non-ionomer polymer binder.

The photochromic material and ionomer generally are any suitable materials that enable stabilization of ionic forms of the materials. The photochromic material and polymer are thus selected such that when in the colored state, the polar nature of the ionomer assists in stabilizing the ionic form of the photochromic material, such as by providing aggregated structures of the photochromic material and the ionomer, which provides the desired stability to the formed image. The materials are also selected such that the photochromic material can readily switch from a first clear or colorless state to a second colored state upon exposure to light such as UV light, and can readily switch from the second colored state back to the first clear or colorless state upon exposure to light such as visible light and/or heat. The color state change in embodiments is reversible, and thus the image can be "erased" and the image forming medium returned to a blank state.

In embodiments, any suitable composition can be used for forming the imaging layer. For example, the imaging layer can comprise a photochromic material dispersed in an ionomer, optionally with an additional non-ionic polymeric binder. The active imaging materials can be dispersed in any suitable medium for forming the imaging layer, such as being dispersed in a solvent, a solution, a polymer binder, or the like; provided in the form of microencapsulated materials; incorporated in an enclosed matrix to hold the imaging composition in place; and the like. However, in embodiments, the active imaging materials are provided such that they form a solid imaging layer on a substrate. In embodiments, the image forming reaction can be reversible an almost unlimited number of times, because the isomerization changes between the clear and colored states do not consume the materials over time.

Any suitable photochromic material can be used, where the photochromic material exhibits the required color change upon exposure to light and optionally heat. The photochromic material may exhibit photochromism, which is a reversible transformation of a chemical species induced in one or both directions by absorption of an electromagnetic radiation between two forms having different absorption spectra. The first form is thermodynamically stable and may be induced by absorption of light such as ultraviolet light to convert to a second form. The second form in embodiments is stable, and forms structures such as aggregates by interaction with ionomers. The reverse reaction from the second form to the first form may occur, for example, by absorption of light such as visible light, and/or thermally. Various exemplary embodiments of the photochromic material may also encompass the reversible transformation of the chemical species among three or more forms in the event it is possible that reversible transformation occurs among more than two forms. The photochromic material of embodiments may be composed of one, two, three, four, or more different types of photochromic materials, each of which has reversibly interconvertible forms. As used herein, the term "photochromic material" refers to all molecules of a specific species of the photochromic material, regardless of their temporary isomeric forms. For example, where the photochromic material is the species spiropyran, which exhibits isomeric forms as spiropyran and merocyanine, at any given moment the molecules of the photochromic material may be entirely spiropyran, entirely merocyanine, or a mixture of spiropyran and merocyanine. In various exemplary embodiments, for each type of photochromic material, one form may be colorless or weakly colored and the other form may be differently colored.

The photochromic material may be any suitable photochromic material that is useful in providing photochromic paper including, for example, organic photochromic materials. Examples of photochromic materials include spiropyrans and related compounds like spirooxazines and thiospiropyrans, benzo and naphthopyrans (chromenes), stilbene, azobenzenes, bisimidazols, spirodihydroindolizines, quinines, perimidinespirocyclohexadienones, viologens, fulgides, fulgimides, diarylethenes, hydrazines, anils, aryl disulfides, aryl thiosulfonates and the like. In the aryl disulfides and aryl thiosulfonates, suitable aryl groups include phenyl, naphthyl, phenanthrene, anthracene, substituted groups thereof, and the like. These materials can variously undergo heterocyclic cleavage, such as spiropyrans and related compounds; undergo homocyclic cleavage such as hydrazine and aryl disulfide compounds; undergo cis-trans isomerization such as azo compounds, stilbene compounds and the like; undergo proton or group transfer phototautomerism such as photochromic quinines; undergo photochromism via electro transfer such as viologens; and the like. Specific examples of materials include:

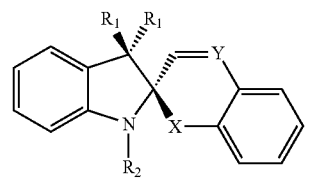

Spiropyran (X = O; Y = ―CH)
Spiooxazine (X = O; Y = N)
Thiospiropyran (X =S; Y = CH)

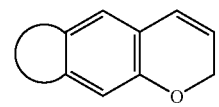

Benzo and Naphtopyran (Chromene)

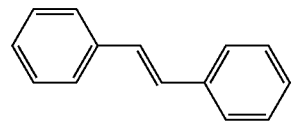

Stilbene

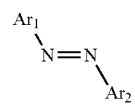

Azobenzene

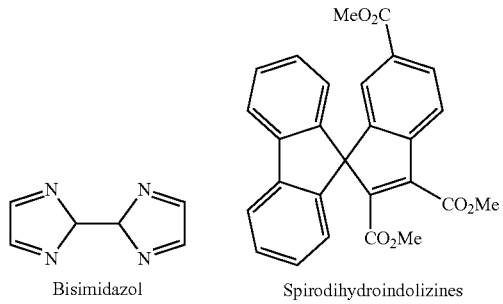

Bisimidazol

Spirodihydroindolizines

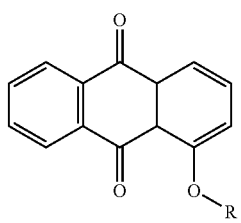

Quinone

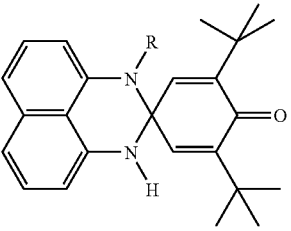

Perimidinespirocyclohexadienones

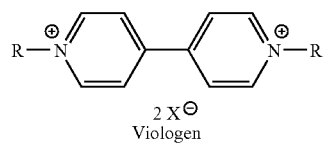

Viologen

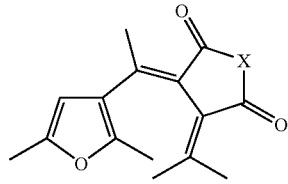

Fulgides (X = O)
Fulgimides (X = NR)

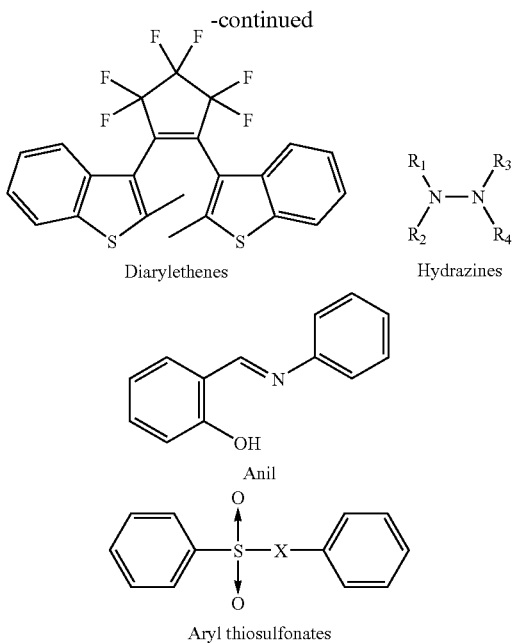

Diarylethenes

Hydrazines

Anil

Aryl thiosulfonates

In these structures, the various R groups (i.e., R, $R_1$, $R_2$, $R_3$, $R_4$) can independently be any suitable group including but not limited to hydrogen; alkyl, such as methyl, ethyl, propyl, butyl, and the like, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, where for each of the foregoing, the alkyl group has from 1 to about 50 or more carbon atoms, such as from 1 to about 30 carbon atoms; aryl, including phenyl, naphthyl, phenanthrene, anthracene, substituted groups thereof, and the like, and having from about 6 to about 30 carbon atoms such as from about 6 to about 20 carbon atoms; arylalkyl; such as having from about 7 to about 50 carbon atoms such as from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, such as having from 1 to about 50 carbon atoms such as from 1 to about 30 carbon atoms; aryloxy groups, such as having from about 6 to about 30 carbon atoms such as from about 6 to about 20 carbon atoms; alkylthio groups, such as having from 1 to about 50 carbon atoms such as from 1 to about 30 carbon atoms; arylthio groups, such as having from about 6 to about 30 carbon atoms such as from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, such as having from 1 to about 20 carbon atoms such as from 1 to about 10 carbon atoms; aryloxy groups, such as having from about 6 to about 20 carbon atoms such as from about 6 to about 10 carbon atoms; alkylthio groups, such as having from 1 to about 20 carbon atoms such as from 1 to about 10 carbon atoms; arylthio groups, such as having from about 6 to about 20 carbon atoms such as from about 6 to about 10 carbon atoms; aldehyde groups; ketone groups; ester groups; amide groups; carboxylic acid groups; sulfonic acid groups; and the like. $Ar_1$ and $Ar_2$ can independently be any suitable aryl or aryl-containing group including but not limited to phenyl, naphthyl, phenanthrene, anthracene, and the like, and substituted groups thereof including any of the substitutions mentioned above for the alkyl, aryl, and arylalkyl groups. X in the spiropyran formula is a suitable heteroatom such as N, O, S, and the like. Y can be —N— or —CH—. $X^-$ in the Viologen formula can be, for example, $F^-$, $Cl^-$, $Br^-$, $I^-$, $BF_4^-$, $PF_6^-$, $B(C_6H_5)_4^-$ and the like. $X^-$ in the aryl thiosulfonate can be, for example, —O—, S, —NH— and the like.

Figure 2:
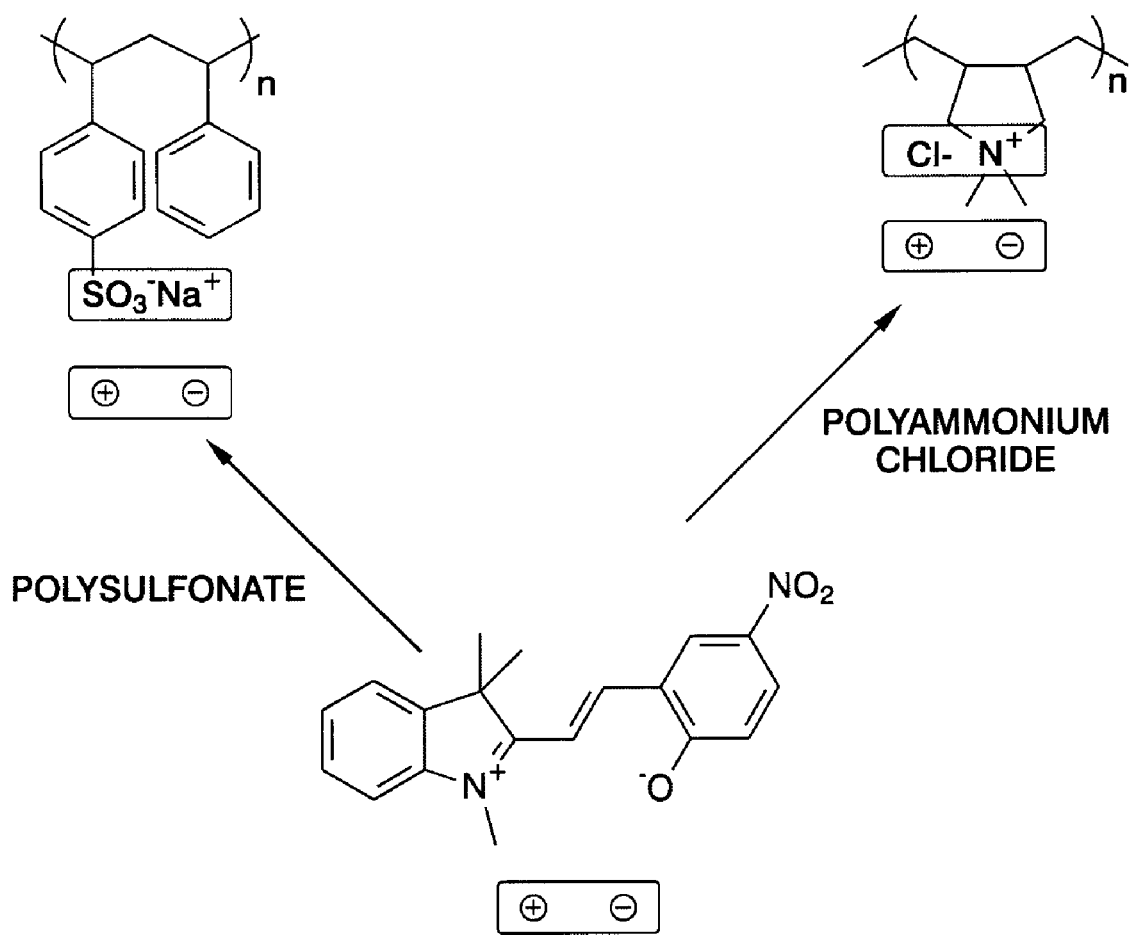
FIG. 2 is a schematic representations of interaction of a photochromic material and ionomers in a solid state.

In embodiments, it is desired that the photochromic material is selected such that it exhibits or obtains sufficient mobility under light and/or heat irradiation to convert from one of the colored or colorless form to the other in the presence of an ionomer (or ionic polymer), where one of the forms is an aggregate form that is more stable to undesired conversion. In these embodiments, the aggregates are not necessarily aggregates of only multiple molecules of the photochromic material, but are aggregates of either multiple molecules of the photochromic material or aggregates of one or more molecules of the photochromic material and one or more molecules or chains of the ionomer. The formation of these aggregates including photochromic material and ionomer lock in the colored state of the photochromic material, and stabilize it against undesired state change back to a colorless form. The ionic interaction between the photochromic material and ionomer provides this desired image stability. For example, FIG. 2 illustratively shows how an ionic photochromic material interacts with two different ionomer polymers.

Any suitable ionomer, also called an ionic polymer or polyelectrolyte, may be used in conjunction with the photochromic material. In general, suitable ionomers are those that exhibit ionic characteristics such that they interact with ionic forms of the photochromic material to form stabilized forms. For instance, polyanions such as polystyrene sodium sulfonate or polycations such as poly(diallyldimethylammonium chloride) can provide complimentary charge stabilization of photochromic materials such as the merocyanine state, as shown in FIG. 2.

The ion containing polymers can be either cationic in nature and contain counter ions including halides (chloride, bromide, iodide or the like) and organic anions such as tosylate, and the like, or anionic in nature with counter ions including alkali, alkaline earth, transition metal or organic cations (such as ammonium or pyridinium). Polyampholytes, which contain both polycation containing segments and polyanion containing segments, can also be employed in embodiments. Suitable polymers include those described in A. Eisenberg and J-S. Kim, *Introduction to Ionomers*, John Wiley and Sons, 1998. For example, suitable polymer repeating units with pendant ionic groups include:

anionic groups of the following structures:

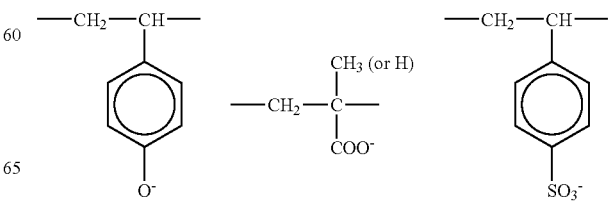

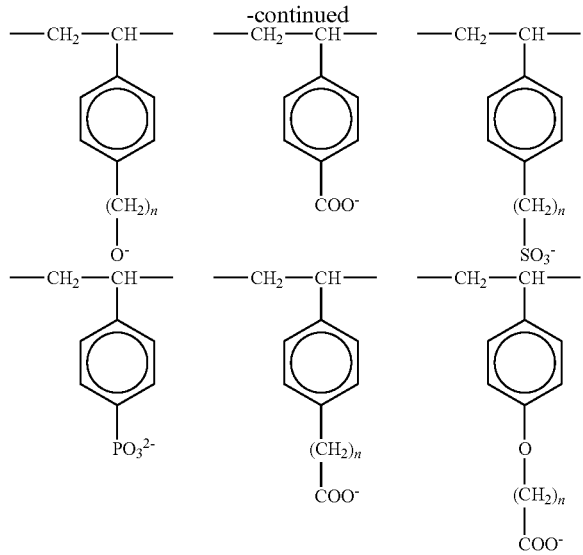

cationic groups if the following structures:

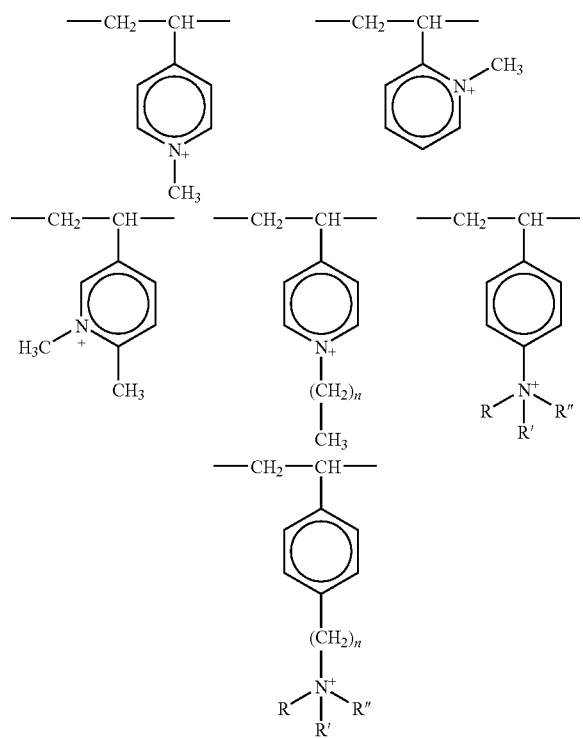

where n represents a number of repeating units, such as from 0 to about 20 or to about 30 or to about 50, such as from 1 to about 15 or to about 20, and R, R' and R" represent suitable unsubstituted or substituted, straight or branched, alkyl group such as methyl, ethyl, propyl, i-propyl, butyl, and the like, or cyclic alkyl group such as cyclopropyl, cyclohexyl, and the like, having from 1 to about 20, such as from 1 to about 15, 1 to about 10, or 1 to about 6 or to about 8, carbon atoms, where the substitutions can include silyl groups, nitro groups, cyano groups, halide atoms, amine groups, hydroxy groups, alkoxy groups such as having from 1 to about 20 carbon atoms, aryloxy groups such as having from about 6 to about 20 carbon atoms, and the like. Other suitable groups include ionene and aromatic ionene polymers, such as containing groups of the formulas:

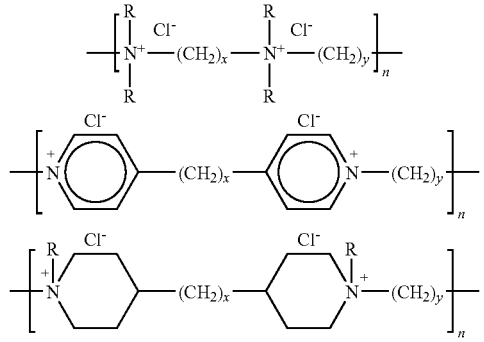

and the like, where x and y represent a number of repeating units, such as from 0 to about 20 or to about 30 or to about 50, such as from 1 to about 15 or to about 20; n represents a number of repeating units in the polymer chain and can range from about 10 to about 100, to about 1,000, to about 10,000 or more; and R is as defined above.

Specific anion containing polymers include, but are not limited to, those based on polystyrene, polymethylmethacrylate and polyacrylates. Specific cation containing polymers include, but are not limited to, those based on polypyridinium and quaternary ammonium salts of polystyrene, both as pendent ionic groups or with the ionic functionality located directly in the polymer backbone. For example, polystyrene sulfonates with counter cations like $Na^+$, $K^+$, $Ca^{2+}$ and the like can be used. Other suitable countercations are ammonium groups of a general structure $NR_1R_2R_3R_4^+$ wherein the $R_1$-$R_4$ groups can be alkyl chains such as from 1 to about 20 or more carbon atoms. Another class of suitable examples are polyacrylic acid salts with countercations like $Na^+$, $K^+$, $Ca^{2+}$ and the like.

The ionic functionality can occur in a variety of different polymer architectures such as those relating to single ions located at one or both (telechelic) ends of the polymer chain, block copolymers, statistical copolymers, random copolymers, comb polymers, graft polymers, and the like. In some embodiments, the photochromic material can be separate from the ionomer, while in other embodiments, the photochromic material can be attached to the ionomer, such as by covalent bonding. In these embodiments, the photochromic material can be attached to the ionomer either at the ends of the polymer chains, as side groups to the polymer chains, or directly into the polymer chain itself. When so incorporated, the photochromic material-ionomer product can take any suitable polymer architecture, such as those relating to incorporation at one or both (telechelic) ends of the polymer chain, block copolymers, statistical copolymers, random copolymers, comb polymers, graft polymers, and the like.

The image forming materials (photochromic material and ionomer) may optionally be dispersed in any suitable carrier, such as solvent, an additional polymer binder, or the like. In embodiments, because the ionomer is itself a polymer that can act as a binder material, an additional binder or carrier is not required, and the ionomer can serve the function of providing a film-forming binder. In other embodiments, a separate film-forming polymer binder can be provided in addition to the ionomer.

Suitable examples of polymer binders include, but are not limited to, polyalkylacrylates like polymethyl methacrylate (PMMA), polycarbonates, polyethylenes, oxidized polyethylene, polypropylene, polyisobutylene, polystyrenes, poly (styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers. In some embodiments, polymethyl methacrylate or a polystyrene is the polymer binder, in terms of their cost and wide availability. These optional polymer binder materials can thus be the same as the base polymer used in forming the ionomer (such as an additional polyester polymer binder used along with a sulfonated metal ion polyester ionomer), except that the additional polymer binder is a non-ionic polymer. The additional polymer binder, when used, has the role to provide a coating or film forming composition.

Phase change materials can also be used as the polymer binder. Phase change materials are known in the art, and include for example crystalline polyethylenes such as Polywax® 2000, Polywax® 1000, Polywax® 500, and the like from Baker Petrolite, Inc.; oxidized wax such as X-2073 and Mekon wax, from Baker-Hughes Inc.; crystalline polyethylene copolymers such as ethylene/vinyl acetate copolymers, ethylene/vinyl alcohol copolymers, ethylene/acrylic acid copolymers, ethylene/methacrylic acid copolymers, ethylene/carbon monoxide copolymers, polyethylene-b-polyalkylene glycol wherein the alkylene portion can be ethylene, propylene, butylenes, pentylene or the like, and including the polyethylene-b-(polyethylene glycol)s and the like; crystalline polyamides; polyester amides; polyvinyl butyral; polyacrylonitrile; polyvinyl chloride; polyvinyl alcohol hydrolyzed; polyacetal; crystalline poly(ethylene glycol); poly(ethylene oxide); poly(ethylene terephthalate); poly(ethylene succinate); crystalline cellulose polymers; fatty alcohols; ethoxylated fatty alcohols; and the like, and mixtures thereof.

In embodiments, the imaging composition can be applied in one form, and dried to another form for use. Thus, for example, the imaging composition comprising photochromic material, ionomer, and optional binder polymer may be dissolved or dispersed in a solvent for application to or impregnation into a substrate, with the solvent being subsequently evaporated to form a dry layer.

In general, the imaging composition can include the imaging material and carrier (ionomer and optional polymer binder) in any suitable amounts, such as from about 0.01 or about 5 to about 99 percent by weight carrier, such as from about 30 to about 70 percent by weight carrier, and from about 0.01 or about 0.05 to about 50 percent by weight photochromic material, such as from about 0.1 to about 5 percent photochromic material by weight. In particular non-limiting embodiments, the photochromic material is present in an amount of from about 0.01% to about 20% by weight of a total dry weight of the imaging layer, and the ionomer is present in an amount of from about 0.01% to about 99% by weight of a total dry weight of the imaging layer.

For applying the imaging layer to the image forming medium substrate, the image forming layer composition can be applied in any suitable manner. For example, the image forming layer composition can be mixed and applied with any suitable solvent or polymer binder, and subsequently hardened or dried to form a desired layer. Further, the image forming layer composition can be applied either as a separate distinct layer to the supporting substrate, or it can be applied so as to impregnate into the supporting substrate.

The image forming medium may comprise a supporting substrate, coated or impregnated on at least one side with the imaging layer. As desired, the substrate can be coated or impregnated on either only one side, or on both sides, with the imaging layer. When the imaging layer is coated or impregnated on both sides, or when higher visibility of the image is desired, an opaque layer may be included between the supporting substrate and the imaging layer(s) or on the opposite side of the supporting substrate from the coated imaging layer. Thus, for example, if a one-sided image forming medium is desired, the image forming medium may include a supporting substrate, coated or impregnated on one side with the imaging layer and coated on the other side with an opaque layer such as, for example, a white layer. Also, the image forming medium may include a supporting substrate, coated or impregnated on one side with the imaging layer and with an opaque layer between the substrate and the imaging layer. If a two-sided image forming medium is desired, then the image forming medium may include a supporting substrate, coated or impregnated on both sides with the imaging layer, and with at least one opaque layer interposed between the two coated imaging layers. Of course, an opaque supporting substrate, such as conventional paper, may be used in place of a separate supporting substrate and opaque layer, if desired.

Any suitable supporting substrate may be used. For example, suitable examples of supporting substrates include, but are not limited to, glass, ceramics, wood, plastics, paper, fabrics, textile products, polymeric films, inorganic substrates such as metals, and the like. The plastic may be for example a plastic film, such as polyethylene film, polyethylene terephthalate, polyethylene naphthalate, polystyrene, polycarbonate, polyethersulfone. The paper may be, for example, plain paper such as XEROX® 4024 paper, ruled notebook paper, bond paper, silica coated papers such as Sharp Company silica coated paper, Jujo paper, and the like. The substrate may be a single layer or multi-layer where each layer is the same or different material. In embodiments, the substrate has a thickness ranging for example from about 0.3 mm to about 5 mm, although smaller or greater thicknesses can be used, if desired.

When an opaque layer is used in the image forming medium, any suitable material may be used. For example, where a white paper-like appearance is desired, the opaque layer may be formed from a thin coating of titanium dioxide, or other suitable material like zinc oxide, inorganic carbonates, and the like. The opaque layer can have a thickness of, for example, from about 0.01 mm to about 10 mm, such as about 0.1 mm to about 5 mm, although other thicknesses can be used.

If desired, a further overcoating layer may also be applied over the applied imaging layer. The further overcoating layer may, for example, be applied to further adhere the underlying layer in place over the substrate, to provide wear resistance, to improve appearance and feel, and the like. The overcoating layer can be the same as or different from the substrate material, although in embodiments at least one of the overcoating layer and substrate layer is clear and transparent to permit visualization of the formed image. The overcoating layer can have a thickness of, for example, from about 0.01 mm to about 10 mm, such as about 0.1 mm to about 5 mm, although other thicknesses can be used. However, in embodiments, an overcoating layer is not used, so as to allow easy evaporation of water formed during the imaging step, in a post-imaging heating step. For example, if desired or necessary, the coated substrate can be laminated between supporting sheets such as plastic sheets.

In embodiments where the imaging material is coated on or impregnated into the substrate, the coating can be conducted by any suitable method available in the art, and the coating method is not particularly limited. For example, the imaging material can be coated on or impregnated into the substrate by dip coating the substrate into a solution of the imaging material composition followed by any necessary drying, or the substrate can be coated with the imaging composition to form a layer thereof. Similarly, the protective coating can be applied by similar methods.

In its method aspects, the present disclosure involves providing an image forming medium comprised of a substrate and an imaging layer comprising a photochromic material dispersed in an ionomer, optionally with an additional polymeric binder, which composition can provided as a dry coating onto or into the substrate. To provide separate writing and erasing processes, imaging is conducted by applying a first stimulus, such as UV light irradiation, to the imaging material to cause a color change, and erasing is conducted by applying a second, different stimulus, such as UV or visible light irradiation, and optionally heat, to the imaging material to reverse the color change. Thus, for example, the imaging layer as a whole could be sensitive at a first (such as UV) wavelength that causes the photochromic material to convert from a clear to a colored state, while the imaging layer as a whole could be sensitive at a second, different (such as visible) wavelength that causes the photochromic material to convert from the colored back to the clear state.

In embodiments, heating can be applied to the imaging layer before or at the same time as the light irradiation, for either the writing and/or erasing processes. However, in embodiments, heating is not required for the writing process, as such stimuli as UV light irradiation are sufficient to cause the color change from colorless to colored, while heating may be desired for the erasing process to assist in increasing material mobility for speeding the color change from colored to colorless. When used, the heat raises the temperature of the imaging composition, particularly the photochromic material, to raise the mobility of the imaging composition and thus allow easier and faster conversion from one color state to the other. The heating can be applied before or during the irradiation, if the heating causes the imaging composition to be raised to the desired temperature during the irradiation. Any suitable heating temperature can be used, and will depend upon, for example, the specific imaging composition used. For example, the heating can be conducted to raise the ionomer and/or additional polymer binder to at or near its glass transition temperature or melting point, such as within about 5° C., within about 10° C., or within about 20° C. of the glass transition temperature or melting point, where the indicated heating temperature can be below or above the glass transition temperature or melting point.

The different stimuli, such as different light irradiation wavelengths, can be suitably selected to provide distinct writing and erasing operations. For example, in one embodiment, the photochromic material is selected to be sensitive to UV light to cause isomerization from the clear state to the colored state, but to be sensitive to visible light to cause isomerization from the colored state to the clear state. In other embodiments, the writing and erasing wavelengths are separated by at least about 10 nm, such as at least about 20 nm, at least about 30 nm, at least about 40 nm, at least about 50 nm, or at least about 100 nm. Thus, for example, if the writing wavelength is at a wavelength of about 360 nm, then the erasing wavelength is desirably a wavelength of greater than about 400 nm, such as greater than about 500 nm. Of course, the relative separation of sensitization wavelengths can be dependent upon, for example, the relatively narrow wavelengths of the exposing apparatus.

In a writing process, the image forming medium is exposed to an imaging light having an appropriate activating wavelength, such as a UV light source such as a light emitting diode (LED), in an imagewise fashion. The imaging light supplies sufficient energy to the photochromic material to cause the photochromic material to convert, such as isomerize, from a clear state to a colored state to produce a colored image at the imaging location, and for the photochromic material to interact with the ionomer to stabilize the image. The amount of energy irradiated on a particular location of the image forming medium can affect the intensity or shade of color generated at that location. Thus, for example, a weaker intensity image can be formed by delivering a lesser amount of energy at the location and thus generating a lesser amount of colored photochromic unit, while a stronger intensity image can be formed by delivering a greater amount of energy to the location and thus generating a greater amount of colored photochromic unit. When suitable photochromic material, ionomer, optional polymer binder, and irradiation conditions are selected, the variation in the amount of energy irradiated at a particular location of the image forming medium can thus allow for formation of grayscale images, while selection of other suitable photochromic materials can allow for formation of full color images.

Once an image is formed by the writing process, the formation of aggregates between the photochromic material and ionomer stabilizes the image. That is, the formed aggregates exhibit low mobility and high stability, whereby the colored state can be "frozen" or locked in, but which cannot be readily erased in the absence of a specific second stimuli. The imaging substrate thus provides a reimageable substrate that exhibits a long-lived image lifetime, but which can be erased as desired and reused for additional imaging cycles.

In an erasing process, the writing process is essentially repeated, except that a different stimuli, such as a different wavelength irradiation light, such as visible light, is used, or when the photochromic material is heated such as to a temperature at or near a glass transition, melting, or boiling point temperature of the carrier material to provide additional mobility and to aid in disrupting the aggregates. The erasing process causes the photochromic unit to convert, such as isomerize, from a colored state to a clear state to erase the previously formed image at the imaging location. The erasing procedure can be on an image-wise fashion or on the entire imaging layer as a whole, as desired.

The separate imaging lights used to form the transient image and erase the transient image may have any suitable predetermined wavelength scope such as, for example, a single wavelength or a band of wavelengths. In various exemplary embodiments, the imaging lights are an ultraviolet (UV) light and a visible light each having a single wavelength or a narrow band of wavelengths. For example, the UV light can be selected from the UV light wavelength range of about 200 nm to about 475 nm, such as a single wavelength at about 365 nm or a wavelength band of from about 360 nm to about 420 nm. For forming the image, as well as for erasing the image, the image forming medium may be exposed to the respective imaging or erasing light for a time period ranging from about 10 milliseconds to about 5 minutes, particularly from about 30 milliseconds to about 1 minute. The imaging and erasing light may have an intensity ranging from about 0.1 mW/cm$^2$ to about 100 mW/cm$^2$, particularly from about 0.5 mW/cm$^2$ to about 10 mW/cm$^2$.

In various exemplary embodiments, imaging light corresponding to the predetermined image may be generated for example by a computer or a Light Emitting Diode (LED) array screen and the image is formed on the image forming medium by placing the medium on or in proximity to the LED screen for the desired period of time. In other exemplary embodiments, a UV Raster Output Scanner (ROS) may be used to generate the UV light in an image-wise pattern. This embodiment is particularly applicable, for example, to a printer device that can be driven by a computer to generate printed images in an otherwise conventional fashion. That is, the printer can generally correspond to a conventional inkjet printer, except that the inkjet printhead that ejects drops of ink in the imagewise fashion can be replaced by a suitable UV light printhead that exposes the image forming medium in an imagewise fashion. In this embodiment, the replacement of ink cartridges is rendered obsolete, as writing is conducted using a UV light source. Other suitable imaging techniques that can be used include, but are not limited to, irradiating a UV light onto the image forming medium through a mask, irradiating a pinpoint UV light source onto the image forming medium in an imagewise manner such as by use of a light pen, and the like.

For erasing an image in order to reuse the imaging substrate, in various exemplary embodiments, the substrate can be exposed to a suitable imaging light, to cause the image to be erased. Such erasure can be conducted in any suitable manner, such as by exposing the entire substrate to the erasing light at once, exposing the entire substrate to the erasing light in a successive manner such as by scanning the substrate, or the like. In other embodiments, erasing can be conducted at particular points on the substrate, such as by using a light pen, or the like.

According to various exemplary implementations, the color contrast that renders the image visible to an observer may be a contrast between, for example two, three or more different colors. The term "color" may encompass a number of aspects such as hue, lightness and saturation, where one color may be different from another color if the two colors differ in at least one aspect. For example, two colors having the same hue and saturation but are different in lightness would be considered different colors. Any suitable colors such as, for example, red, white, black, gray, yellow, cyan, magenta, blue, and purple, can be used to produce a color contrast as long as the image is visible to the naked eye of a user. However, in terms of desired maximum color contrast, a desirable color contrast is a dark gray or black image on a light or white background, such as a gray, dark gray, or black image on a white background, or a gray, dark gray, or black image on a light gray background.

In various exemplary embodiments, the color contrast may change such as, for example, diminish during the visible time, but the phrase "color contrast" may encompass any degree of color contrast sufficient to render an image discernable to a user regardless of whether the color contrast changes or is constant during the visible time.

An example is set forth herein below and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

A methanol (2 liters) solution of a merocyanine (ionic form, 30 g), polystyrene sodium sulfonate (PSSNa) 200 g is prepared as an imaging composition. The solution is coated onto Xerox 4024 paper and allowed to dry to provide a uniformly colored sheet of paper. The paper sheet is conditioned to become essentially colorless by heating it uniformly at a temperature above 80° C.

The paper is written by exposing desired areas to UV light (365 nm). The printed paper is readable for longer than a one day period of time when kept in the ambient room light conditions. For comparison, an imaging composition prepared as above but without an ionomer fades in about 20 hours when kept under ambient room light conditions.

Example 2

A 2 liters methanol/THF solution containing 20 g of 1',3'-dihydro-1',3',3'-trimethyl-6-nitrospiro-(2H-1-benzopyran-2,2'-(2H)-indole (photochromic material) and 200 g of polystyrene sodium sulfonate (PSSNa) is prepared as an imaging composition. The solution is coated onto Xerox 4024 paper and allowed to dry to provide a document in the clear state. The document is written by exposing desired areas to a UV light source (LED) of wavelength of 380 nm for 10 seconds. The printed paper is readable for longer than a one day period of time when kept in the ambient room light conditions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following.

What is claimed is:

1. An image forming medium, comprising
a substrate; and
an imaging layer coated on or impregnated into said substrate, wherein the imaging layer comprises a photochromic material dispersed in an ionomer, optionally with an additional polymeric binder;
wherein the photochromic material exhibits a reversible transition between a colorless state and a colored state in response to heat and optional light; and
the photochromic material is attached to the ionomer.

2. The image forming medium of claim 1, wherein the photochromic material converts from a colorless state to a colored state upon irradiation with light of a first wavelength and converts from a colored state to a colorless state upon irradiation with light of a second wavelength different from the first wavelength.

3. The image forming medium of claim 2, wherein the photochromic material in an ionic state associates with ionic groups of the ionomer to form stable aggregates.

4. The image forming medium of claim 1, wherein the photochromic material is selected from the group consisting of a spiropyran compound, spirooxazine, thiospiropyran, a benzo compound, naphthopyran, stilbene, azobenzene, bisimidazol, spirodihydroindolizine, quinine, perimidinespirocyclohexadienone, viologen, fulgide, fulgimide, diarylethene, hydrazine, anil, aryl disulfide, and aryl thiosulfonate.

5. The image forming medium of claim 1, wherein the photochromic material is a spiropyran, spirodihydroindolizine, or spirooxazine compound.

6. The image forming medium of claim 1, wherein the ionomer is selected from the group consisting of:
   a cationic polymer containing counterions selected from halogen atoms and tosylate groups,
   an anionic polymers containing counterions selected from the group consisting of alkali, alkaline earth, transition metal, and organic cations, and
   polyampholytes containing both polycation containing segments and polyanion containing segments.

7. The image forming medium of claim 1, wherein the ionomer contains ionic groups selected from the group consisting of the following structures:

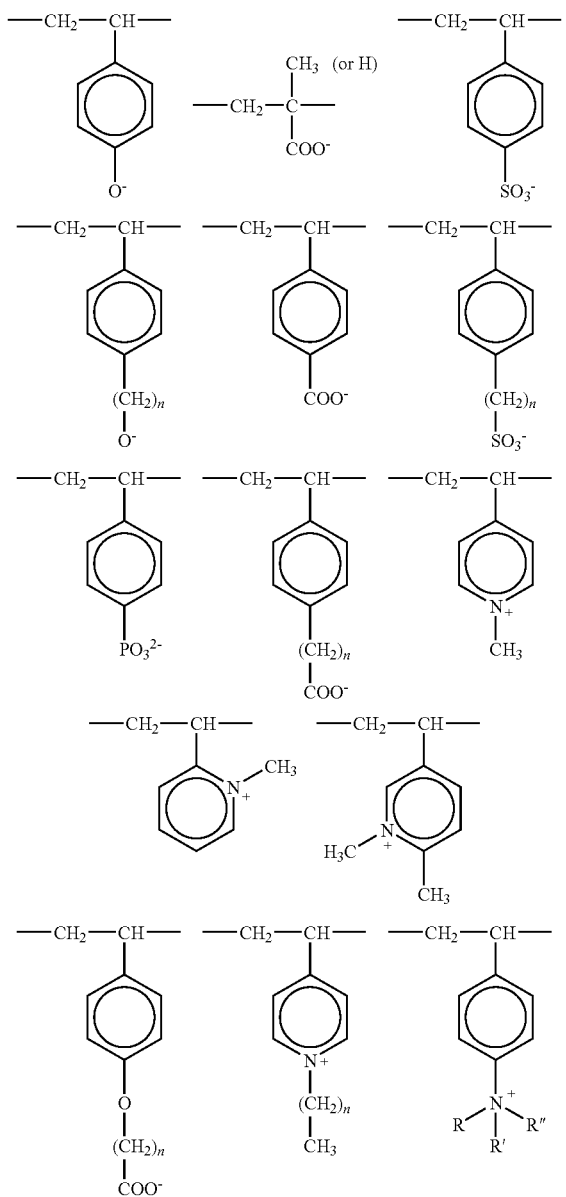
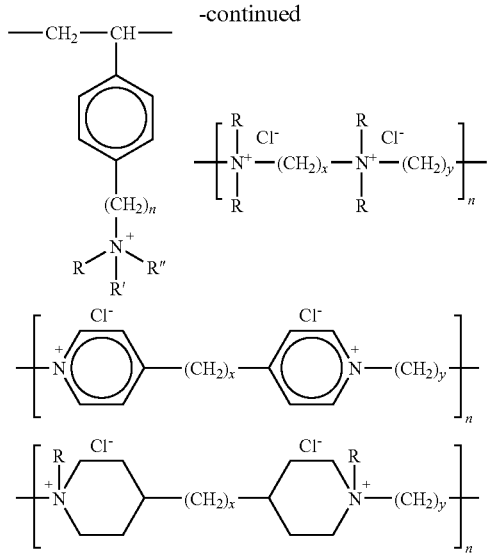

where x, y, and n represents a number of repeating units, and R, R' and R" independently represent unsubstituted or substituted, straight or branched, alkyl group or cyclic alkyl group having from 1 to about 20 carbon atoms.

8. The image forming medium of claim 1, wherein the ionomer is a polymer containing pendant ionic groups, the polymer selected from the group consisting of polystyrene, polymethylmethacrylate, polyacrylates, polypyridinium, and quaternary ammonium salts of polystyrene.

9. The image forming medium of claim 1, wherein the ionomer is the only polymer binder present in the imaging layer.

10. The image forming medium of claim 1, wherein the imaging layer further comprises the polymeric binder, wherein said polymeric binder is not an ionomer.

11. The image forming medium of claim 10, wherein the polymeric binder is selected from the group consisting of polyalkylacrylates, polycarbonates, polyethylenes, oxidized polyethylene, polypropylene, polyisobutylene, polystyrenes, poly(styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, polystyrene-acrylonitrile, polyethylene-acrylate, vinylidenechloride-vinylchloride, vinylacetate-vinylidene chloride, styrene-alkyd resins, and mixtures thereof.

12. The image forming medium of claim 1, wherein the photochromic material is present in an amount of from about 0.01% to about 20% by weight of a total dry weight of the imaging layer.

13. The image forming medium of claim 1, wherein the ionomer is present in an amount of from about 0.01% to about 99% by weight of a total dry weight of the imaging layer.

14. The image forming medium of claim 1, wherein the substrate is selected from the group consisting of glass, ceramic, wood, plastic, paper, fabric, textile, metals, plain paper, and coated paper.

15. A method of making an image forming medium, comprising applying an imaging layer composition to a substrate, wherein the imaging layer composition comprises a photochromic material dispersed in an ionomer, optionally with an additional polymeric binder;

wherein the photochromic material exhibits a reversible transition between a colorless state and a colored state in response to heat and optional light; and the photochromic material is attached to the ionomer.

16. The method of claim 15, wherein the applying comprises coating the imaging layer over the substrate or impregnating the imaging layer into the substrate.

17. The method of claim 15, wherein the imaging layer composition further comprises the polymeric binder, and the polymeric binder is not an ionomer.

18. A method of forming an image, comprising:
providing an image forming medium comprising:
 a substrate; and
 an imaging layer coated on or impregnated into said substrate, wherein the imaging layer comprises a photochromic material dispersed in an ionomer, optionally with an additional polymeric binder; and
exposing the image forming medium to UV irradiation of a first wavelength in an imagewise manner to form a visible image,
wherein the photochromic material exhibits a reversible transition between a colorless state and a colored state in response to heat and optional light; and
the photochromic material is attached to the ionomer.

19. The method of claim 18, further comprising:
exposing the image forming medium bearing said image to thermal energy, wherein said thermal energy causes said photochromic material to change from the colored state to the colorless state; and
repeating the step of exposing the image forming medium to the UV irradiation of a first wavelength in an imagewise manner at least one additional time.

20. The method of claim 18, wherein the photochromic material in an ionic state associates with ionic groups of the ionomer to form stable aggregates.

21. The method of claim 18, wherein the exposing is for a time period ranging from about 10 milliseconds to about 5 minutes at an intensity ranging from about 0.1 mW/cm$^2$ to about 100 mW/cm$^2$.

22. An imaging system, comprising:
the image forming medium of claim 1;
a printer comprising two irradiation sources, wherein one irradiation source sensitizes the photochromic material to convert the photochromic material from a colorless state to a colored state the other irradiation source converts the photochromic material from a colored state to a colorless state.

* * * * *